Patented Apr. 16, 1935

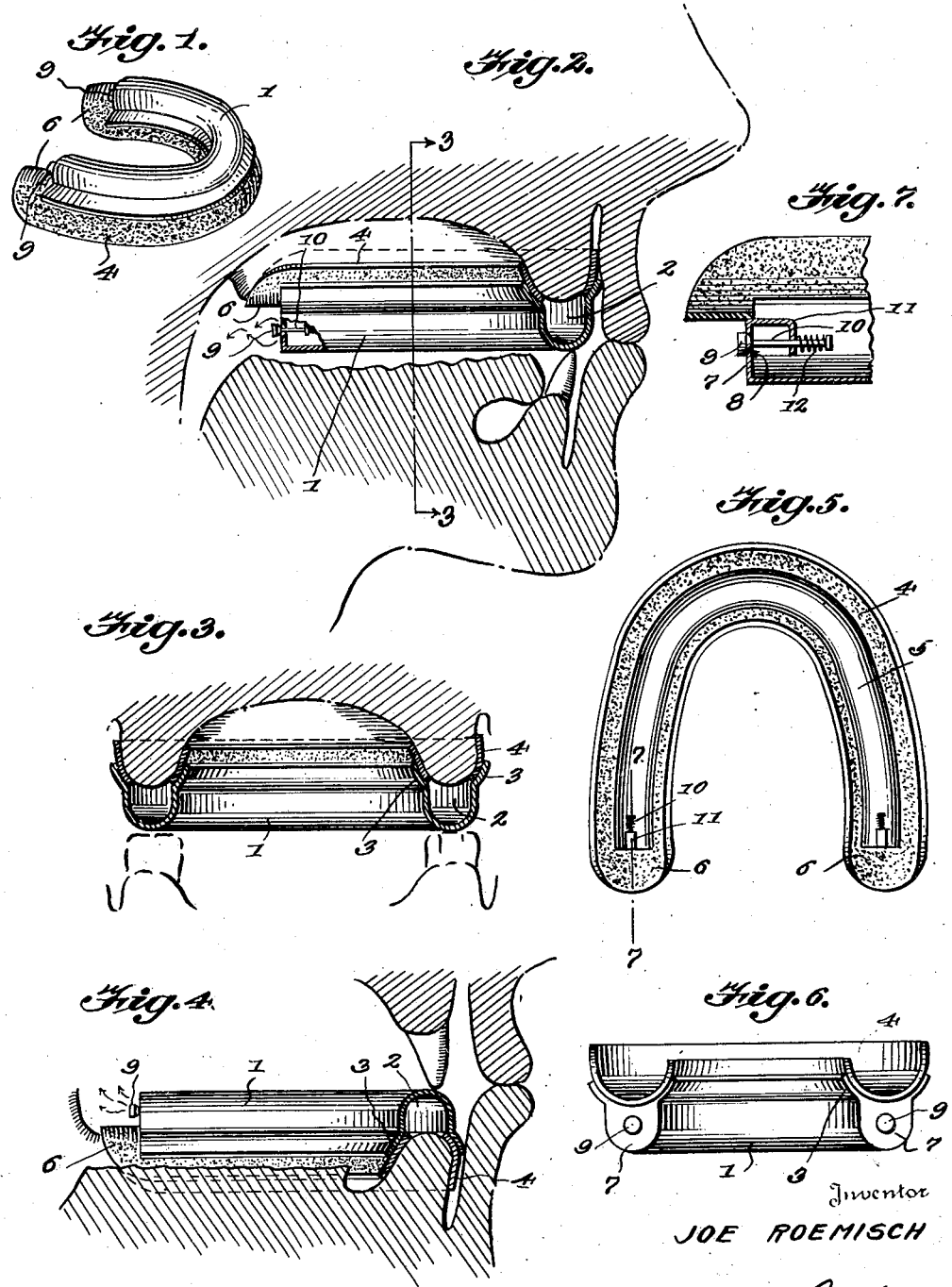

1,998,203

UNITED STATES PATENT OFFICE 1,998,203

GUM DEVELOPER

Joe Roemisch, Hermleigh, Tex.

Application October 19, 1933, Serial No. 694,309

3 Claims. (Cl. 32—1)

This invention relates to gum developers, and has for one of its objects the production of a simple and efficient device which is especially adapted for developing the gums of a patient after the teeth have been extracted so as to prevent the gums from shrinking and at the same time build up the gums in a proper formation so as to efficiently retain false teeth.

A further object of this invention is the production of a simple and efficient gum developer which is so constructed as to provide an efficient suction or vacuum grip upon the gums so as to properly form the gums and prevent the same from shrinking.

A still further object of the invention is the provision of a simple and efficient gum developer which is provided with valve means for automatically extracting the air from under the gums and thereby more efficiently provide a suction or vacuum grip upon the gums when the gum developer is placed in contacting position with the gums.

Other objects and advantages of the present invention will appear throughout the following specification and claims.

In the drawing:—

Figure 1 is an inverted perspective view of the gum developer;

Figure 2 is a vertical sectional view illustrating the gum developer in position and in engagement with the upper gums;

Figure 3 is a section taken on line 3—3 of Figure 2;

Figure 4 is a vertical sectional view of the gum developer in position upon the lower gum;

Figure 5 is a top plan view of the gum developer;

Figure 6 is an end elevation of the gum developer looking at the open end thereof; and Figure 7 is an enlarged section taken on line 7—7 of Figure 5.

By referring to the drawing, it will be seen that 1 designates the body of the gum developer which comprises a substantially U-shaped structure having an enlarged channel 2 formed within the body, the enlarged channel 2 terminating at its side edges in outwardly flared flanges 3. This body 1 is preferably formed of rigid material such as hard rubber, celluloid, or other suitable material, and the channel is so constructed as to provide a channel of substantial depth as shown in the drawing. A relatively soft pad 4 is secured to the inner face of the flanges 3, as shown clearly in Figures 2, 3, 4 and 5, and this relatively soft pad is preferably formed of soft rubber or other soft cushioning material, the inner face of this pad 4 being adapted to contact with the surfaces of the gum, as clearly illustrated in the drawing. The soft pad 4 preferably projects beyond the outer edges of the flanges 3 to permit the soft pad to freely flex and snugly fit in contacting engagement with the gums. This pad 4 is provided with a substantially U-shaped aperture or slot 5, the pad fitting snugly in engagement with the flanges 3 and having closed end portions 6 at the end of the U-shaped body 1, as shown in Figure 5, to provide an air-tight fit around the gums and along the full length thereof.

The outer ends of the U-shaped body 1 are provided with closed walls 7, which closed walls are provided with valve apertures 8, clearly shown in Figure 7, the valve apertures 8 or ports being normally closed by the valve head 9 in each instance. Each valve head 9 is supported upon a stem 10 which is slidably mounted through a suspending bracket 11, shown clearly in Figure 7, and a coil spring 12 is carried by each stem 10 and normally urges the valve head 9 to a closed position upon its valve apertures or seat 8. The spring 12 will normally close the valve but will permit the same to readily operate for the purpose of extracting air from the channel 2.

It should be understood that the gum developer may also serve in the place of teeth or the usual plate to keep the lips in proper shape and if worn regularly, the device would not only develop the gums to securely hold the dental plates, but would also keep the facial muscles and jaw in proper position.

The operation of the device is as follows:—

The body 1 is placed in position, as shown in either Figures 1 or 4, so as to contact with either the upper or lower gum. It of course should be understood that should it be desired, two of these devices may be used simultaneously, one upon the upper gum, and one upon the lower gum without departing from the spirit of the invention. The body 1 is placed in a position to cause the soft or resilient pad 4 to contact firmly with the faces of the gums and the body is then forced firmly into contacting and wedging relation with the gums thereby creating an efficient suction or vacuum pull within the channel 2, any excess air being extracted through the apertures or valve seats 8 due to the forcing of the valve heads 9 to an open position and as soon as the air has been extracted the springs 12 will cause the valves 9 to immediately move to a closed position maintaining a proper suction or vacuum within the channel 2 for holding the device in a proper position.

By carefully considering the drawing, it will be noted that the body through the medium of the slightly flared or inclined flanges will provide an opening around one side of the body to provide a gum receiving slot or channel.

Having described the invention, what is claimed as new is:—

1. A gum developer comprising an approximately U-shaped body formed of rigid material, said body having a channel throughout its length of material depth, walls of the channel being U-shaped in cross section and formed with flanged gum engaging marginal portions, the ends of the channel being closed, a soft gum gripping pad extending around the edges of the body and carried by the gum engaging portions of the walls of the channel, and air release means carried by the ends of the body.

2. A gum developer comprising a substantially U-shaped body defining a deep channel having its walls U-shaped in cross section and its ends closed, upper marginal portions of the walls being flared to form inner and outer bordering flanges for the body disposed at an incline, a soft suction pad carried by said flanges for facilitating tight gripping of the gums, portions of the channel between the flanges being exposed and spaced from the gums when the developer is in use, and valve means carried by said body for automatically releasing air from the body when the body is forced into place with the pad in contacting engagement with the gums.

3. A gum developer comprising a substantially U-shaped body having a longitudinally extending channel, the ends of the body being closed, a longitudinal face of the body being open and walls of the channel being U-shaped in cross section and formed with flaring bordering flanges, a soft pad carried by the flanges and extending around the open portion of the channel for providing an efficient gum gripping surface, said pad extending across the closed ends of the body and the portions of the channel between the flanges being exposed, said closed ends of the body having air releasing ports formed therein, a spring pressed inwardly closing valve extending through each port and adapted to normally close the same, and suspending brackets carried by the body within the channel for slidably supporting said valves in proper alignment upon the body.

JOE ROEMISCH.